US012643069B2

(12) United States Patent
Wilson et al.

(10) Patent No.: US 12,643,069 B2
(45) Date of Patent: Jun. 2, 2026

(54) SYSTEM FOR DEHUMIDIFYING AIR

(71) Applicant: Wilson Innovations & Consulting, LLC, Dunedin, FL (US)

(72) Inventors: Todd S. Wilson, Indian Rocks Beach, FL (US); Janet M. Wilson, Indian Rocks Beach, FL (US)

(73) Assignee: Wilson Innovations & Consulting, LLC, Dunedin, FL (US)

( * ) Notice: Subject to any disclaimer, the term of this patent is extended or adjusted under 35 U.S.C. 154(b) by 326 days.

(21) Appl. No.: 18/455,325

(22) Filed: Aug. 24, 2023

(65) Prior Publication Data

US 2024/0066463 A1 Feb. 29, 2024

Related U.S. Application Data

(60) Provisional application No. 63/401,223, filed on Aug. 26, 2022.

(51) Int. Cl.
*B01D 53/26* (2006.01)
*B01D 53/28* (2006.01)

(52) U.S. Cl.
CPC ......... *B01D 53/263* (2013.01); *B01D 53/266* (2013.01); *B01D 53/28* (2013.01); *B01D 2275/205* (2013.01)

(58) Field of Classification Search
CPC .... B01D 53/26; B01D 53/28; B01D 53/0407; B01D 53/261; B01D 53/263; B01D 53/266; B01D 2275/205
See application file for complete search history.

(56) References Cited

U.S. PATENT DOCUMENTS

| | | | |
|---|---|---|---|
| 11,420,501 B1 * | 8/2022 | Brooks | .............. B01D 46/0036 |
| 2007/0012186 A1 * | 1/2007 | Wilson | .............. B01D 46/0036 |
| | | | 95/117 |
| 2021/0121816 A1 * | 4/2021 | Kim | ....................... B01D 46/88 |

* cited by examiner

*Primary Examiner* — Sharon Pregler

(74) *Attorney, Agent, or Firm* — Andrew Behrens; Trenam Law

(57) ABSTRACT

A device for dehumidifying a column of air has a frame has an outer frame; the outer frame having an outer wall. An inner frame having an inner frame wall is disposed on the frame, spaced from the outer wall at an interior of the outer wall. A channel is formed between the outer wall and inner frame wall. A front panel, formed as a grid, is disposed on the outer wall and is coextensive with the frame. A back panel, formed as a grid, is disposed on an opposed side of the outer frame wall, from the front and is coextensive with the frame. Each grid has sufficient openings therein so as not to significantly impede the flow of air through the device from the front panel to the back panel. An air filter medium is disposed within the space defined by the inner frame wall. A desiccant is disposed within the channel.

12 Claims, 2 Drawing Sheets

SYSTEM FOR DEHUMIDIFYING AIR

CROSS REFERENCE TO RELATED APPLICATIONS

This application claims the benefit of U.S. Provisional Application No. 63/401,223 filed on Aug. 26, 2023, the entire disclosure of which is hereby incorporated in its entirety.

BACKGROUND OF THE INVENTION

The present invention is directed to a system for dehumidifying air, and more particularly, for providing a system for dehumidifying air utilizing existing HVAC systems, by utilizing the filter as both a filtering medium and dehumidifying structure, without the need for additional equipment in the conventional heating, ventilation, and air conditioning system ("HVAC").

Anyone who has stepped outside on a July day in Florida, or other places, knows that air can carry moisture as a liquid vapor; humidity. Water vapor, in particular, can condense or collect on moisture sensitive surfaces providing an environment which promotes mildew, fungus, and mold, not to mention rust, corrosion, swelling, degradation and other irritation or damage.

Water vapor condenses on surfaces cooler that the temperature of the moisture saturated air. As known in the art, warmer air holds water more effectively than colder air, however water vapor moves from warmer air to cooler air due to the vapor pressure differential between a high vapor pressure of warm air and the lower vapor pressure of relatively cooler air. Therefore, exposure of a column of air to objects or even other air streams having lower temperatures than the ambient air will affect whether moisture is released from the column of air. However, removing moisture from the column of air (dehumidification), reduces the temperature the air must be to be saturated and thereby reduces the likelihood that moisture will be released from the column of air.

It is known that desiccant materials may be used to remove water vapor from air due to their high affinity for water molecules. There are two types of desiccant materials: absorbents and adsorbents. Absorbent desiccants undergo a chemical change in the presence of water. Adsorbent desiccants, on the other hand, attract water molecules in pores without chemical change to the desiccant.

It is known in the art from applicants' US Published Application No. 2007/0012186 entitled System and Method of Dehumidifying and Filtering Air to integrate desiccant material into the filter medium of an air filter to dehumidify the air as it passes through the filter. However, the desiccant material was not able to maintain its integrity or maintain its position within the filter material in mass quantities or over time and therefore did not operate properly to adequately remove humidity from the air flow.

Accordingly, a system which overcomes the shortcomings of the prior art is desired.

SUMMARY OF THE INVENTION

A device for reducing the amount of particles and water vapor in a column of air has a frame having an outer frame; the outer frame having an outer wall. An inner frame is disposed on the frame, forming an inner frame wall spaced from the outer wall at an interior of the outer wall. A channel is formed between the outer wall and inner frame wall. A front, formed as a grid, is disposed on the outer wall and is coextensive with the frame. A back, formed as a grid, is disposed on an opposed side of the outer frame wall from the front and is coextensive with the frame. Each grid has sufficient openings therein so as not to significantly impede the flow of air through the device from the front to the back. An air filter medium is disposed within the space defined by the inner frame wall. A desiccant is disposed within the channel.

In one embodiment the desiccant is contained compartmentalized in a packet or contained in a breathable, outer material.

In another embodiment of the invention, a hinge is disposed between the outer frame wall and at least one of the back and front to make at least one of the back and front rotatable relative to the outer frame.

BRIEF DESCRIPTION OF THE DRAWINGS

The features and advantages of the present invention will become more readily apparent from the following detailed description of the invention in which like elements are labeled similarly and in which.

DETAILED DESCRIPTION OF THE PREFERRED EMBODIMENTS

Figure 1:
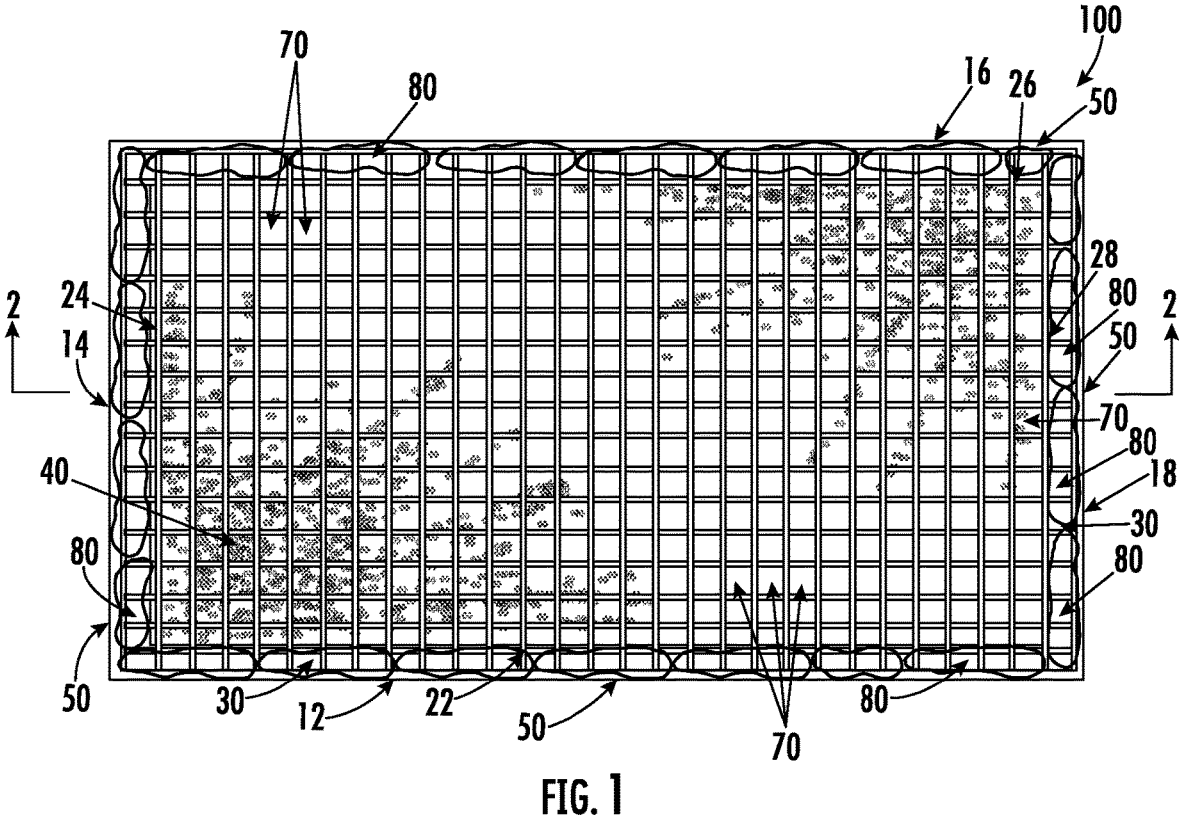
FIG. 1 is a top plan view of a system for dehumidifying air constructed in accordance with the invention.
Figure 2:
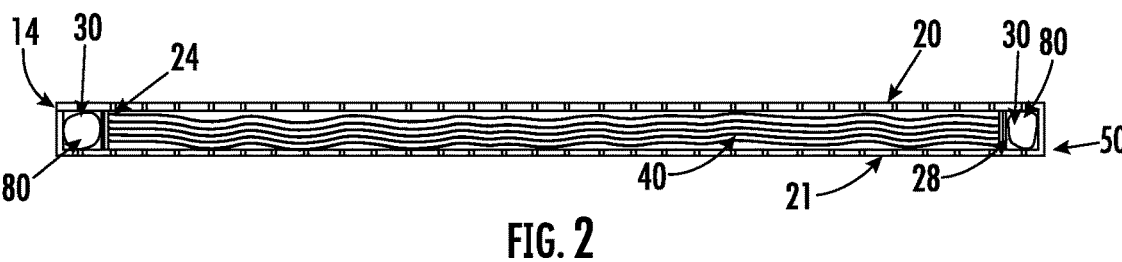
FIG. 2 is a sectional view taken along line 2-2 of FIG. 1.

Reference is first made to FIG. 1 in which a system, generally indicated as 100, for dehumidifying air constructed in accordance with the invention is provided. System 100 includes a frame 50 for holding a filter media 40 disposed therein to position filter media 40 across an airflow path when system 100 is disposed in a conventional air-conditioning/heating system.

Frame 50 includes an outer frame formed by contiguous frame walls 12, 14, 16, and 18 defining the interior area of frame 50. An inner frame formed by contiguous frame walls 22, 24, 26 and 28 is disposed in the interior area of frame 50 and in facing spaced relationship with a respective one of frame walls 12, 14, 16, and 18 to form a channel 30 therebetween. A front panel 20, formed as a grid, is disposed on, and substantially coextensive with the outer frame walls 12, 14, 16 and 18 of frame 50. In this way, at least the outer walls of frame 50 support front panel 20. A back panel 22, formed as a grid, is disposed on, and substantially coextensive with an opposed side of the outer frame walls 12, 14, 16 and 18 of frame 50 from front panel 20. In this way at least the outer walls of frame 50 support front panel 20. Either one of back panel 21 and/or front panel 20 may also be supported on the inner frame.

Filter media 40 is disposed within, and is substantially coextensive with, an area defined by contiguous frame walls 22, 24, 26 and 28. Each of front panel 20 and back panel 21 is formed with openings, and preferably a grid having openings, exemplified by openings 70, in a non-limiting embodiment, to maximize air passage from front panel 20 to back panel 21 when frame 50 is disposed in a conventional HVAC. In this way, during normal operation of an HVAC having a system 100, air flows in path through front panel 20, through filter media 40 and through back panel 21, on the way to an area being heated or cooled.

A desiccant generally indicated as 80 is disposed in channel 30 about the inner wall. Desiccant 80 may be provided "loose" in powdered form, or in compartmentalized, breathable outer material or packets. Desiccant 80 adsorbs/absorbs the moisture from the air passing through frame 50. This is accomplished by desiccant 80 adsorbing/absorbing the moisture in the passive air, which will mix with the active air passing through the filter medium 40 as a result of the negative pressure experienced by the air at the filter during operation of the HVAC. Desiccant 80 does not have to be directly in the airflow path in order to dehumidify. As a result of the laws of equilibrium, the more humid air gravitates to the less humid air. Therefore, the passive air around desiccant 80 will strive for equilibrium, which in turn will cause the passive air to be exchanged with the more humid air from the air flow.

In an embodiment, desiccant 80 is selected from the group consisting of $CaCl_2$, $CaSO_3$, $MgCl_2$, LiBr, LiCl, $K_2CO_3$, $Pb(NO_3)_2$, KF, $NaSO_4$, $K_3PO_4$, $CrO_3$, $NaNO_2$, $Mg(NO_3)_2$, KSCN, $KC_2H_3O_2$, $Zn(NO_3)_2$, $ZnBr_2$, $K_2HPO_4$, $NaClO_3$, impregnated or coated or chemically modified activated carbon, silica, chemically modified silica, zeolites, chemically modified zeolites, aluminas, chemically modified aluminas, molecular sieves, polyalcohols, polyethers, polysaccharides, polyacrylamides, polyacrylates, 2-acrylomido-2-methyl-1-propane-sulphonic acid, and polystyrene sulfonic acid and their salts, and combinations or mixtures thereof.

Desiccant materials 80 may also include any solid material, in any suitable physical form, that has characteristics of adsorbing/absorbing inorganic or organic molecules. Solid desiccant material 80 may exist in any suitable physical form such as particles, nanoparticles, crystals, powder, granules, pellets, and generally every possible shape and size. In one embodiment, solid desiccant material 80 ranges in size from about 1 nm to about 4 mm in length.

Solid desiccant material 80 may include silica, chemically modified silica (silica gel, silicates), zeolites, chemically modified zeolites, aluminas, chemically modified aluminas, molecular sieves, activated carbon, impregnated or coated or chemically modified activated carbon, and combinations or mixtures thereof. The activated carbon may be in granular, amorphous, fiber, extrudate, or powder form and can include coconut activated carbon, wood activated carbon and bituminous coal activated carbon.

Examples of organic desiccant compounds of the present invention include polyalcohols such as polyethylene glycol 300, polypropylene glycol 700, block copolymers of polyethylene glycol and polypropylene glycol, and glycerol; polyethers; polysaccharides; polyacrylamides; polyacrylates and combinations or mixtures thereof.

Desiccant material 80 of the present invention can also include other suitable desiccant compounds such as 2-acrylomido-2-methyl-1-propane-sulphonic acid and poly-styrene sulfonic acid and their salts with sodium, lithium, potassium and cesium and combinations or mixtures thereof.

Additionally, a biocide, such as antifungal or antimold material, may be included with or adjacent to the desiccant material. Other air purifying or conditioning materials may be used.

The filter medium 40 may form any suitable two-dimensional planar shape such as a two-sided layer. The filter medium may include multiple sheets of the porous material layered together or structured to assume a more three-dimensional shape such as a block, cylinder, tube, honeycomb structure or any other suitable shape for the conduction of air through the filter. Accordingly, the filter medium includes an external surface and at least one internal surface.

Figure 3:
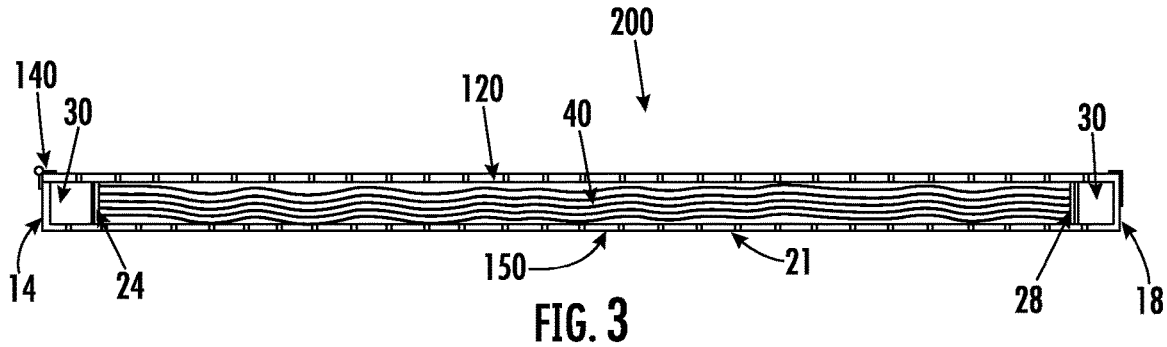
FIG. 3 is a sectional view of a system for dehumidifying air constructed in accordance with the invention in a closed position.
Figure 4:
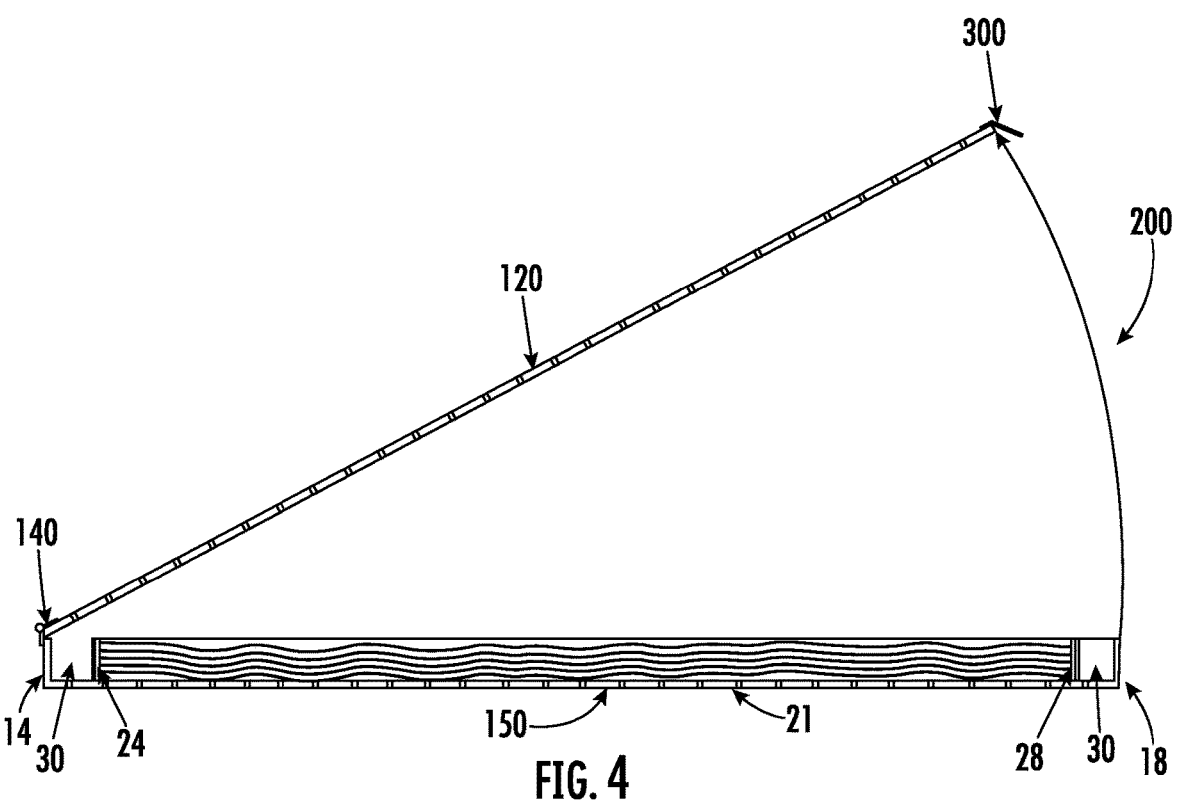
FIG. 4 is a sectional view of a system for dehumidifying air constructed in accordance with the invention in an open position.

Reference is now made to FIGS. 3 and 4 in which a second embodiment of the invention, generally indicated as 200, is provided. Like numerals are used to indicate like structure, the primary difference being the incorporation of a hinged front panel to enable replacement of filter medium 40 and desiccant 80, making frame 50 reusable.

A front panel 120 is rotatably affixed to outer frame wall 14 by a hinge 140. Rotation of front panel 120 in the direction of arrow A provides access to the interior of frame 150; including access to desiccant 80 in channels 30 and filter media 40 for replacement. Once replaced, front panel 120 is rotated in the reverse direction to a closed position and is secured in place by a latch or other securing mechanism 300 affixed to an edge of front panel 120 opposite to hinge 140.

It should be noted that hinge 140 can be connected at any edge of front panel 120 as well as rear panel 22 in a rear panel opening embodiment.

It will thus be seen that the objects set forth above, among those made apparent from the preceding description, are efficiently attained and, since certain changes may be made in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for reducing the amount of particles and water vapor in a column of air comprises:

a. a frame having an outer frame, the outer frame having an outer wall, and an inner frame disposed on the frame, forming an inner frame wall spaced from the outer wall at an interior of the outer wall;

b. wherein the inner frame wall is spaced from the outer wall to define a continuous peripheral channel between the outer wall and the inner frame wall, the continuous peripheral channel surrounding the inner frame;

c. a front panel, formed as a grid, disposed on at least the outer wall and inner frame wall and is coextensive with the frame, the front panel extending across both the continuous peripheral channel and a space defined by the inner frame wall;

d. a back panel, formed as a grid, disposed on an opposed side of the outer wall from the front panel, on at least the outer wall and inner frame wall, and being coextensive with the frame, the back panel extending across both the continuous peripheral channel and the space defined by the inner frame wall, the front panel and the back panel each having openings therein to allow air to flow through the device from the front panel to the back panel;

e. an air filter medium disposed between the front panel and the back panel within the space defined by the inner frame wall, the air filter medium being substantially coextensive with the space defined by the inner frame wall, the air filter medium defining a direct airflow path through the air filter medium between the front panel and the back panel; and

f. a desiccant disposed only within the continuous peripheral channel and outside the direct airflow path.

2. The device of claim 1, wherein the front panel has openings therein aligned with openings of the back panel to provide the direct airflow path through the air filter medium between the front panel and the back panel.

3. The device of claim 1, wherein the desiccant is selected from the group consisting of $CaCl_2$, $CaSO_3$, $MgCl_2$, LiBr, LiCl, $K_2CO_3$, $Pb(NO_3)_2$, KF, $NaSO_4$, $K_3PO_4$, $CrO_3$, $NaNO_2$, $Mg(NO_3)_2$, KSCN, $KC_2H_3O_2$, $Zn(NO_3)_2$, $ZnBr_2$, $K_2HPO_4$, $NaClO_3$, impregnated or coated or chemically modified activated carbon, silica, chemically modified silica, zeolites, chemically modified zeolites, aluminas, chemically modified aluminas, molecular sieves, polyalcohols, polyethers, polysaccharides, polyacrylamides, polyacrylates, 2-acrylomido-2-methyl-1-propane-sulphonic acid, and polystyrene sulfonic acid and their salts, and combinations or mixtures thereof.

4. The device of claim 1, further comprising a direct airflow path extending through the air filter medium within the space defined by the inner frame wall, the desiccant being disposed about a surface outside the space defined by the inner frame wall.

5. The device of claim 1, wherein the desiccant is in the form of a powder, compartmentalized, or a packet.

6. The device of claim 1, wherein the desiccant is a solid material configured to adsorb or absorb inorganic molecules, organic molecules, or both.

7. The device of claim 6, wherein the desiccant has a physical form selected from the group consisting of particles, nanoparticles, crystals, powder, granules, and pellets.

8. The device of claim 7, wherein the desiccant ranges from 1 nm to 4 mm in length.

9. The device of claim 1, wherein the channel further comprises a biocide disposed therein, the biocide purifying or conditioning air passing there through the channel.

10. The device of claim 1, wherein the front panel further comprises a hinge affixed thereon at a first edge of the front panel for rotatably affixing the front panel to the outer frame wall and a securing mechanism affixed to the front panel at a second edge, opposite the first edge, for releasably securing the front panel to the outer frame wall.

11. The device of claim 1, wherein the back panel further comprises a hinge affixed thereon at a first edge of the back panel for rotatably affixing the back panel to the outer frame wall and a securing mechanism affixed to the back panel at a second edge, opposite the first edge, for releasably securing the back panel in place to the outer frame wall.

12. The device of claim 1, wherein the air filter medium forms a three-dimensional shape having an external surface and at least one internal surface.

\* \* \* \* \*